April 15, 1930.  R. S. STEWART  1,754,372
ANNEALING POT
Filed Oct. 12, 1927
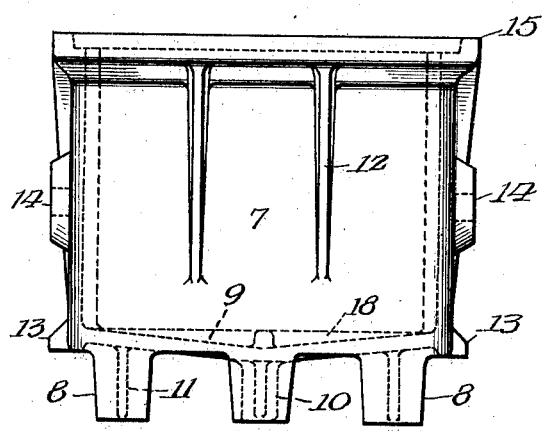
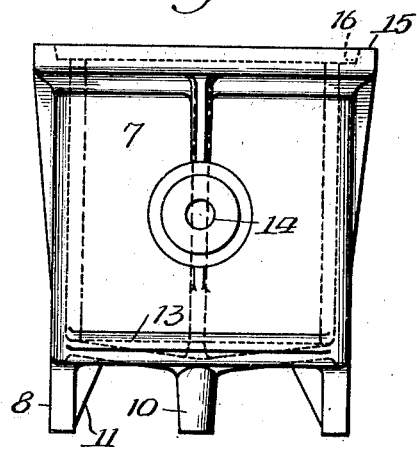
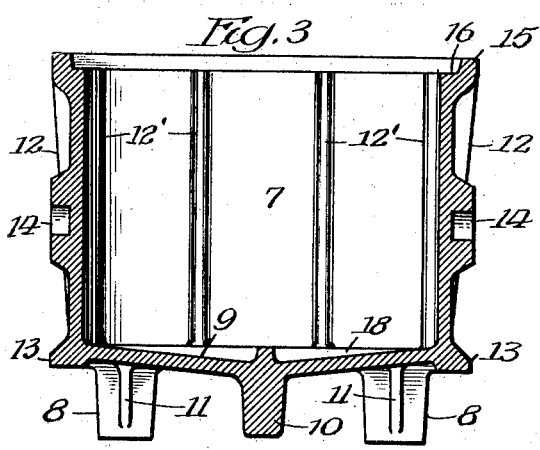
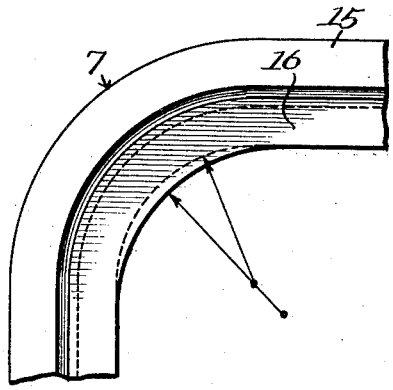
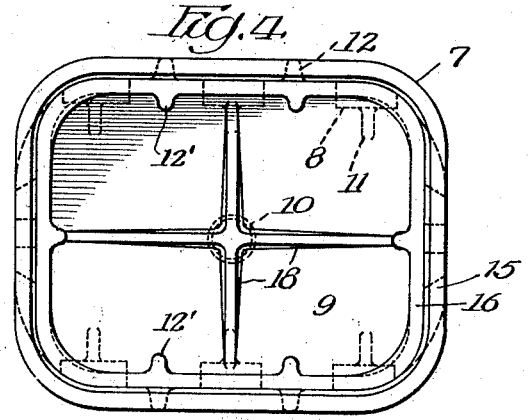
Inventor
Robert S. Stewart
By Wm. O. Bell
Atty.

Patented Apr. 15, 1930

1,754,372

UNITED STATES PATENT OFFICE

ROBERT S. STEWART, OF CHICAGO, ILLINOIS, ASSIGNOR TO THE AMERICAN BRAKE SHOE & FOUNDRY COMPANY, OF NEW YORK, N. Y., A CORPORATION OF DELAWARE

ANNEALING POT

Application filed October 12, 1927. Serial No. 225,655.

This invention relates to annealing pots and it has for its object to dispense with the separate stool which has heretofore been used as a base or support for each pot and to space the pots when stacked one upon the other, and to provide integral means on each pot for supporting and for spacing pots in a stack, whereby to reduce the weight of each pot and the aggregate weight of a stack of pots, to reduce the number of parts and to simplify handling and stacking the pots, to reduce the height of a stack, and thereby provide additional annealing capacity or circulation space in the oven, to economize fuel consumption, and to provide for more efficient circulation of heat.

With these and other ends in view the invention contemplates the provision of integral legs on the bottom of the pot to form a support for the pot and to space the pots in stacking. The invention may be embodied in closed bottom pots, or in open bottom pots and I have illustrated the invention in both kinds of pots in the accompanying drawings wherein Fig. 1 is a side elevation and Fig. 2 is an end elevation of an annealing pot embodying the invention.

Fig. 3 is a longitudinal sectional view of the pot shown in Figs. 1 and 2.

Fig. 4 is a top plan view of the pot shown in Figs. 1-3.

Fig. 5 is an enlarged detail of one corner of the pot.

The pots herein selected for illustration are substantially rectangular in shape with rounded corners, but the invention may be embodied in round pots or in pots of other shapes. Referring to Figs. 1-4 the pot 7 is provided with a plurality of legs 8 suitably disposed about the bottom 9 of the pot and all made integral therewith. The number of legs may be varied according to the size or capacity of the pot and the size of the legs may be varied accordingly. In the drawings I have shown three legs on the bottom below one wall of the pot and three oppositely disposed legs on the bottom below the opposite wall of the pot, the legs on each side being equally spaced apart. I may also provide legs at the ends of the bottom of the pot, but ordinarily they are not required. An additional leg 10 is located at the center of the bottom and is made integral therewith. The legs 8 are located at the outer edge of the bottom and the outer face of the legs is substantially flush with the outer face of the walls of the pot from which they project. Webs 11 are preferably provided on the inside of the legs 8 to reinforce and strengthen them. The center leg 10 may be made round and solid, as shown. The pot may be provided with vertical strengthening ribs 12 on the outer face of its walls and with vertical strengthening ribs 12' on the inner face of its walls, or with one set of ribs, as desired, and it may also be provided with the horizontal strengthening ribs 13 at its ends. Suitable trunnions are provided on opposite walls of the pot and they may be of the recessed type 14. The top of the pot is flared at 15 and is provided interiorly with a shoulder seat 16 to receive the legs of another pot when they are stacked one upon the other. The corners of the pot are curved and an excess of metal 17 is provided at the inside of each corner to form a "compensated radius" as more fully set forth in my application Serial No. 222,994, filed September 30, 1927. The bottom of the pot may be provided with crossed ribs 18 on the upper face thereof, or these ribs may be provided on the lower face of the bottom, or both sets of ribs may be used.

My invention provides an annealing pot of a simple construction which can be made in one integral unit as a closed bottom pot, or in a two part unit in an open bottom pot, it dispenses entirely with the separate stool which has heretofore been used as a support for the pot and for spacing the pots when stacked one upon the other and which must be separately handled at all times. By eliminating the separate stool and providing the pot with integral legs I am able to reduce the weight of each pot considerably and correspondingly reduce the weight of a stack of pots which materially facilitates handling the pots and is advantageous in many other respects. The stool heretofore employed has a plate which engages the bottom of the pot and provides a double thickness of metal at the bottom of the pot which retards the penetration of heat, but this plate is eliminated by my invention and the bottom of the pot may be of the same thickness as the wall of the pot. By eliminating the separate stool and providing integral legs on the pot I reduce the quantity of pot metal to be heated in an annealing oven and I have found in actual practice that this produces an economy represented by a saving in fuel consumption measured in tons varying, of course, according to conditions. Eliminating the separate stool also reduces the height of each pot and its support and correspondingly reduces the height of a stack, so that more empty space is provided in the oven which is available to increase the capacity of the oven or for increasing the circulation space. The ordinary stool heretofore employed projects beyond the wall and bottom of the pot and not only absorbs heat, but interferes with the heat circulation. The integral legs project in line with the wall of the pot from the bottom thereof and they may be comparatively small in size so that they offer comparatively little metal to absorb heat and do not to any material extent obstruct the circulation of heat.

I do not restrict the invention to the particular details of construction herein shown and described because it will be apparent that the invention may be embodied in pots differently constructed; and I reserve the right to make all such changes as fall within the scope of the following claim.

I claim:

An annealing pot embodying in one integral element, a body and a bottom wall inclined downwardly to a central point, a plurality of legs projecting downwardly from the said bottom at the corners, a leg integral with the bottom wall at said central point, and integral tapered crossed ribs on the inner side of said bottom, the said ribs intersecting at said central point over the centre leg.

ROBERT S. STEWART.